A. C. BURNER.
Flood-Fences.
No. 155,066.            Patented Sept. 15, 1874.
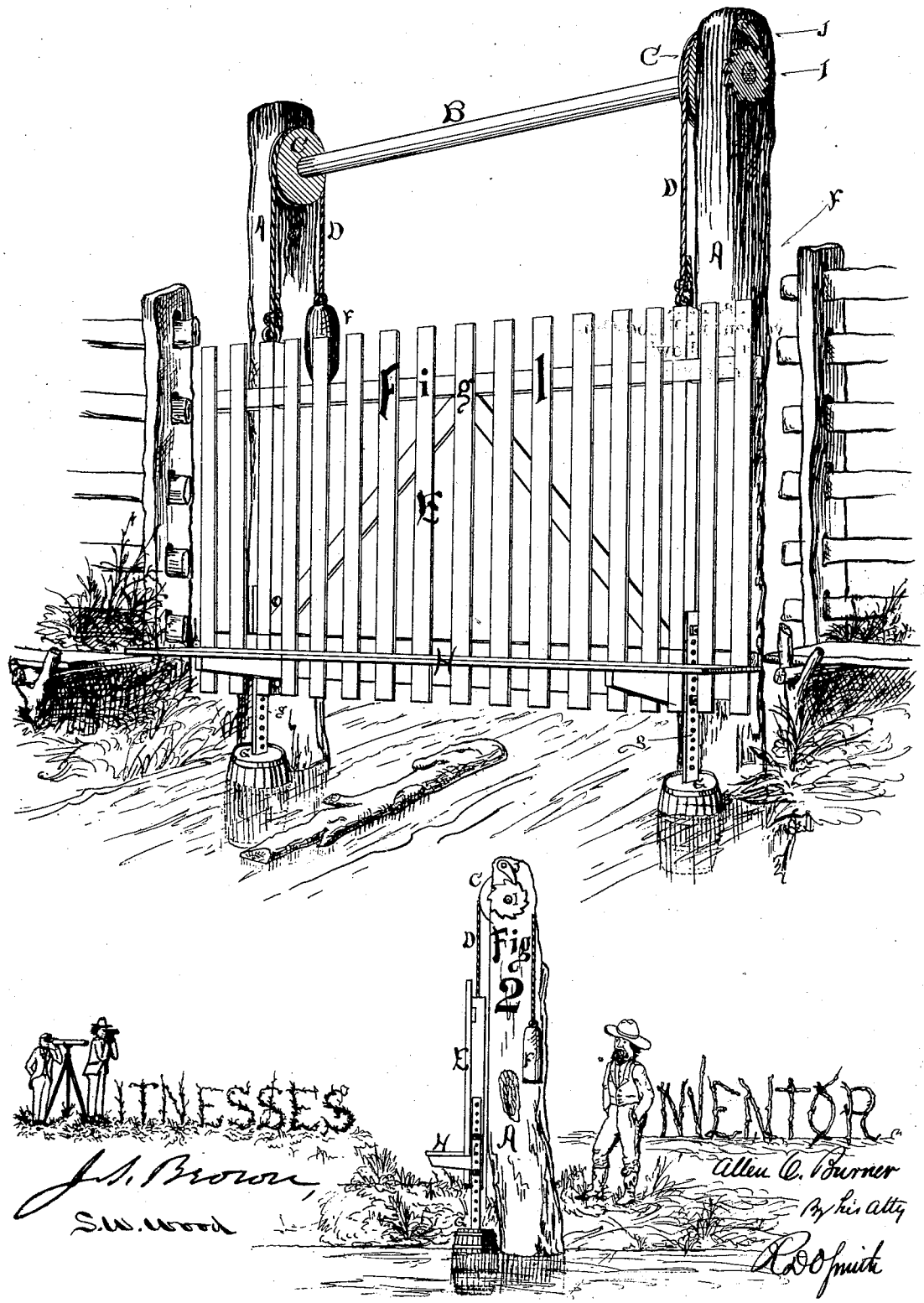

UNITED STATES PATENT OFFICE.

ALLEN C. BURNER, OF GREEN BANK, WEST VIRGINIA.

IMPROVEMENT IN FLOOD-FENCES.

Specification forming part of Letters Patent No. 155,066, dated September 15, 1874; application filed August 31, 1874.

*To all whom it may concern:*

Be it known that I, ALLEN C. BURNER, of Green Bank, in the county of Pocahontas and State of West Virginia, have invented a new and useful Improvement in Flood-Gates; and I do hereby declare the following to be a full, clear, and exact description of the same, reference being had to the accompanying drawings, in which—

Figure 1 is a perspective view of my gate in position. Fig. 2 is an end elevation of the same.

My invention relates to that class of flood-gates which rest upon floats, and rise or fall in a vertical plane, as the water swells or recedes; and it consists, first, in adjustable floats whereby the gate may be set entirely above the surface of the water sufficiently far to permit the free passage of floating objects under it, if desired; second, in the use of balancing-weights in connection with a shaft between the pulleys, whereby the two ends of the gate will necessarily rise or fall at the same time, notwithstanding one of the floats may be damaged or unserviceable; third, in the use of a foot-board upon which persons may cross from one side of the stream to the other; fourth, in the use of a ratchet and pawl, in connection with the pulley-shaft and foot-board, whereby, when the gate has been raised by the rise of water, it will not descend again automatically, and whereby the weight of a person upon the foot-board will not cause the floats to be submerged to any greater depth than otherwise.

That others may understand my invention, I will particularly describe it.

A A are two stout posts set firmly in the bank at the edge of the stream. At the top of said posts, and extending from one to the other, is a shaft, B, its ends resting in boxes or bearings at the tops of said posts. A sheave or pulley, C, is placed on said shaft at each end thereof, and the suspending cords or chains D D pass over said pulleys. Said cords are attached at one end to the frame of the gate E, and at the other to the counter-weights F, which are nearly equal to the weight of the gate, and the latter is thereby controlled by two small floats, G G, one under each end. The gate E may be constructed after any approved method, and it may hang freely against the down-stream sides of the posts A, or it may be confined in grooves or by cleats along the side of said posts. The floats G G may be very small, and may be almost or entirely protected from moving current of water by the posts A A.

In ordinary stages of the water it may be desirable to have the lower edge of the gate close to the water, so as to prevent duck or geese from going through, as well as cattle, while, during a time of flood, it may be desirable or necessary to have the gate elevated considerably above the surface of the water, in order to permit the free passage of floating objects. I therefore make the floats G adjustable up or down by attaching them to standards $g$ $g$, which are slotted or provided with a series of holes through which bolts may pass to secure said standards to the end bars of the gate. By this, or any other suitable means, the floats G G may be shifted up or down, and the gate E be thereby caused to set at the desired distance from the surface.

Especially in time of flood means of crossing small streams are scarce and unreliable. I therefore propose to construct my gate with a foot-board, H, placed near its lower edge, upon which persons may cross, and said foot-board will form a bridge always above the surface of the water. To prevent the foot-board and gate from sinking under the weight of a person crossing, I place upon the shaft B, or one of the pulleys C, a ratchet, I, and pawl J. These permit the gate to rise freely as the water rises, but will not permit it to fall again, either under the weight of a person crossing, or when the water recedes, until the pawl J shall be removed from engagement with the rack I.

Having described my invention, what I claim as new is—

1. In combination with the flood-gate E, the adjustable floats G G, substantially as and for the purpose set forth.

2. In combination with the gate E and counterpoise-weights F, the shaft B, and pulleys C C, secured to each end thereof, substantially as and for the purpose set forth.

3. In combination with a flood-gate, E, a foot-board, H, to form a foot-bridge, substantially as and for the purpose set forth.

4. In combination with the gate E, counterpoise-weights F F, floats G G, and shaft and pulleys B C C, the ratchet and pawl I J, substantially as and for the purpose set forth.

In testimony that I claim the above as my invention witness my hand.

ALLEN C. BURNER.

Witnesses:
   R. D. O. SMITH,
   GEO. BARTLE.